B. G. LA BAR.
GEARING FOR ELECTRICAL MEASURING INSTRUMENTS.
APPLICATION FILED AUG. 9, 1916.
1,327,832.
Patented Jan. 13, 1920.
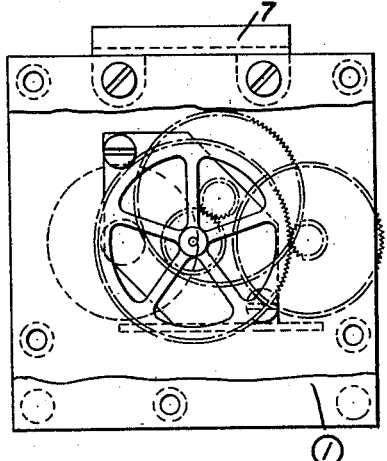
WITNESSES:
Fred. A. Lind
R. J. Ridge
INVENTOR
Bert G. LaBar
BY
Wesley G. Carr
ATTORNEY

UNITED STATES PATENT OFFICE.

BERT G. LA BAR, OF TURTLE CREEK, PENNSYLVANIA, ASSIGNOR TO WESTINGHOUSE ELECTRIC AND MANUFACTURING COMPANY, A CORPORATION OF PENNSYLVANIA.

GEARING FOR ELECTRICAL MEASURING INSTRUMENTS.

1,327,832. Specification of Letters Patent. Patented Jan. 13, 1920.

Application filed August 9, 1916. Serial No. 113,904.

*To all whom it may concern:*

Be it known that I, BERT G. LA BAR, a citizen of the United States, and a resident of Turtle Creek, in the county of Allegheny and State of Pennsylvania, have invented a new and useful Improvement in Gearings for Electrical Measuring Instruments, of which the following is a specification.

My invention relates to electrical measuring instruments and particularly to gearing for two-speed indicating devices for ampere-hour meters and other similar instruments.

The object of my invention is to provide a device of the above indicated character that shall have relatively frictionless means for shifting and holding the driving mechanism in its various operative positions.

In ampere-hour meters for storage battery installations it is desirable to cause the pointer or indicator to turn at a relatively greater speed in one than in the other direction in order to compensate for the loss of energy due to the inefficiency of the storage batteries. Various means have been suggested for causing the driving mechanism of the meter to engage different gear devices for the purpose of obtaining the necessary change in speeds. However, such devices, as heretofore constructed, were inefficient in that the meshing and demeshing of the gear mechanisms caused a relatively large amount of friction and lost motion.

In view of the above, I provide a driving member, two driven members, a shiftable gear device disposed between the said members and a spring-restrained loosely-mounted worm wheel carried by the shiftable gear device and adapted to engage the driving member for the purpose of moving the shiftable gear device in the direction of movement of the driving member.

In the accompanying drawings, Figure 1 is a front elevational view, with parts broken away, of a two-speed indicating device embodying my invention; Fig. 2 is a side elevational view, with parts broken away, of the device shown in Fig. 1; Fig. 3 is a bottom plan view of the device shown in Fig. 1; Fig. 4 is a rear elevational view of the two-speed indicating device embodying my invention, and Fig. 5 is a detail plan view of a portion of the device shown in Fig. 4.

A two-speed indicating device 1, embodying my invention, comprises a frame work having three plates 2, 3 and 4 that are spaced apart and secured together by members 5 and 6. A member 7 is mounted on the plate 3 for the purpose of securing the device 1 to an ampere-hour meter or other similar device (not shown). Two supporting brackets 8 and 9 are mounted on the plate 4 and are adapted to support a rotatable spindle 10 upon which a worm wheel 11, a gear wheel 12 and a pinion 13 are mounted. The gear wheel 12 is adapted to engage a pinion 14 that is mounted upon a shaft 15 upon which the armature 16 of the ampere-hour meter (not shown) is also mounted. A pivotally-mounted member 17 is so supported by projections 18 and 19 on the plate 4 that it is adapted to oscillate between predetermined limits. A spindle 20 is supported, at one end, by the member 17 and, at its other end, by a bearing member 37 on the plate 4. The spindle 20 is provided with a worm screw 21 and a gear wheel 22. The gear wheel 22 is adapted to engage the pinion 13 that is mounted on the spindle 10 for the purpose of turning the worm screw 21 in the same general direction as that of the armature 16.

Two spindles 23 and 24 are mounted between the plates 3 and 4 and are provided with worm wheels 25 and 26 and pinions 27 and 28, respectively. The worm screw 21 is adapted to engage the one or the other of the worm wheels 25 and 26, depending upon the direction of movement of the armature 16. The pinion 27 is adapted to drive a spindle 29 through a system of gears 30 that is mounted between the plates 2 and 3 and, similarly, the pinion 28 is adapted to drive the spindle 29 through a system of gears 31 that is also mounted between the plates 2 and 3. The gear systems 30 and 31 are so proportioned that the spindle 29 will be driven in one direction at a speed that is relatively greater than that at which it is driven in the opposite direction.

A bracket 32 is mounted on the member 17, and is provided with a spindle or pin 33 upon which is loosely mounted a worm screw 34 and a relatively light spring 35 at each of its ends for yieldingly holding the worm screw 34 in a central position thereon. The worm wheel 11, that is mounted upon the spindle 10, is adapted to engage the worm screw 34 in order that, when the armature 16 turns in one direction, the worm screw 34 will move along the pin 33 against the action of one of the springs 35 to thus cause the member 17 and, consequently, the worm screw 21, to move to such position that the worm screw 21 will engage the one or the other of the worm wheels 25 and 26.

The springs 35 are of such dimensions that a relatively small movement of the worm wheel 11 will cause the member 17 to move in the direction of rotation of the worm wheel 11. Thus, since the restraining action upon the driving worm wheel 11 is substantially a pure rolling motion, the amount of restraining friction is relatively small.

It will be understood that, since the distance between the gear wheels 25 and 26 is relatively short, and, since the slightest movement of the worm wheel 11 causes the worm screw 21 to be disengaged from one of the worm wheels and to engage the other, the registration error caused by meshing and demeshing the gears is obviated. In other words, as soon as the armature 16 reverses its direction of movement, the connection between the worm screw 21 and the respective worm wheels 25 and 26 is so made that the armature 16 will drive the spindle 29, upon which is mounted a pointer 36, at a predetermined speed depending upon the direction of movement and the speed of the armature 16. It will, of course, be understood that the armature 16 drives the pointer 36 through the pinion 14, the gear wheel 12, the pinion 13, the gear wheel 22 and the worm screw 21.

I do not limit my invention to the particular structure illustrated or to the particular applications set forth, as it may be variously modified without departing from the spirit and scope of the invention as set forth in the appended claims.

I claim as my invention:

1. In a two-speed gear device, the combination with a driving member and two driven members, of an oscillatory member, a worm screw mounted on the said oscillatory member and adapted to engage the said driven members, and a loosely mounted worm screw on the said oscillatory member operatively connected to the driving member and adapted to be resiliently held in a central position.

2. In a two-speed gear device, the combination with a driving member and two driven members, of an oscillatory member, a worm screw mounted on the said oscillatory member and adapted to be driven by the driving member and to actuate the driven members, a loosely mounted worm screw on the said oscillatory member, and means for normally holding the loosely mounted worm screw in its central position in engagement with the driving member.

3. In a two-speed device, the combination with a driving member and two driven members, of a pivoted member, a spindle mounted on the pivoted member, a worm screw mounted on the spindle and adapted to engage the driven members, a gear wheel mounted on the spindle and adapted to engage the driving member, a second spindle mounted on the pivoted member at substantially right angles to the other spindle, a worm screw loosely mounted on the said second spindle and adapted to engage the driving member, and means for yieldingly holding the said loosely-mounted worm screw in its central position on the spindle.

4. The combination with a driving member and two driven members, of a pivotally-mounted member, a gear member mounted on the pivotally-mounted member and adapted to engage the one or the other of the driven members, and a spring-restrained means mounted on the pivotally-mounted member and adapted to engage the driving member for moving the gear member into and out of engagement with the driven members.

5. The combination with a driving member and two driven members, of a pivotally-mounted member, a gear member mounted on the pivotally-mounted member and adapted to engage either the one or the other of the driven members, and means mounted on the pivotally-mounted member and adapted to engage the driving member for moving the gear member into and out of engagement with the driven members.

6. The combination with a driving member and two driven members, of a pivotally-mounted member, a gear member mounted on the pivotally-mounted member and adapted to engage either the one or the other of the driven members, and means for yieldingly resisting the movement of the pivotally-mounted member in any direction other than the direction of movement of the driving member.

In testimony whereof I have hereunto subscribed my name this 21st day of July, 1916.

BERT G. LA BAR.